United States Patent [19]

Ann

[11] Patent Number: 5,479,389

[45] Date of Patent: Dec. 26, 1995

[54] ECCENTRICITY COMPENSATOR FOR OPTICAL DISK PLAYER AND COMPENSATING METHOD THEREFOR

[75] Inventor: Jong-tae Ann, Suwon, Rep. of Korea

[73] Assignee: Samsung Electronics Co., Ltd., Kyungki-Do, Rep. of Korea

[21] Appl. No.: 234,945

[22] Filed: Apr. 28, 1994

Related U.S. Application Data

[63] Continuation-in-part of Ser. No. 91,134, Jul. 14, 1993, abandoned.

[30] Foreign Application Priority Data

Jul. 14, 1992 [KR] Rep. of Korea .................. 92-12527

[51] Int. Cl.$^6$ ...................................................... G11B 7/00
[52] U.S. Cl. ............................. 369/47; 369/48; 369/50; 369/58; 369/44.32
[58] Field of Search ................................. 369/47, 48, 49, 369/50, 53, 54, 58, 59, 60, 32, 124, 44.32, 44.28, 44.25

[56] References Cited

U.S. PATENT DOCUMENTS 4,700,337 10/1987 Inagawa et al. .
4,764,860 8/1988 Takao ..................... 369/50 X
5,023,857 6/1991 Verboom ................. 369/50 X
5,086,421 2/1992 Tateishi .
5,121,374 6/1992 Barton et al. .

Primary Examiner—Georgia Y. Epps
Assistant Examiner—Muhammad D. Edun
Attorney, Agent, or Firm—Sughrue, Mion, Zinn, Macpeak & Seas

[57] ABSTRACT

An eccentricity compensator for an optical disk player includes an amplifier for amplifying detected phase difference signals and outputting the amplified phase difference signal to a driving circuit, a system controller for recognizing whether a currently played disk surface is the top or bottom thereof and then comparing the error of the velocity controlling amount of a spindle motor with a reference tolerance, so as to output a control signal according to the comparison result, and a gain controller for, in the case of top-surface playback in which the velocity controlling amount is greater than the reference tolerance, controlling the gain of the amplifier in response to the control signal of the system controller, so as to vary the velocity of the spindle motor, and so as to reproduce normally a double-sided disk whose top and bottom surfaces have different eccentricities.

6 Claims, 4 Drawing Sheets

55mm ±100μm

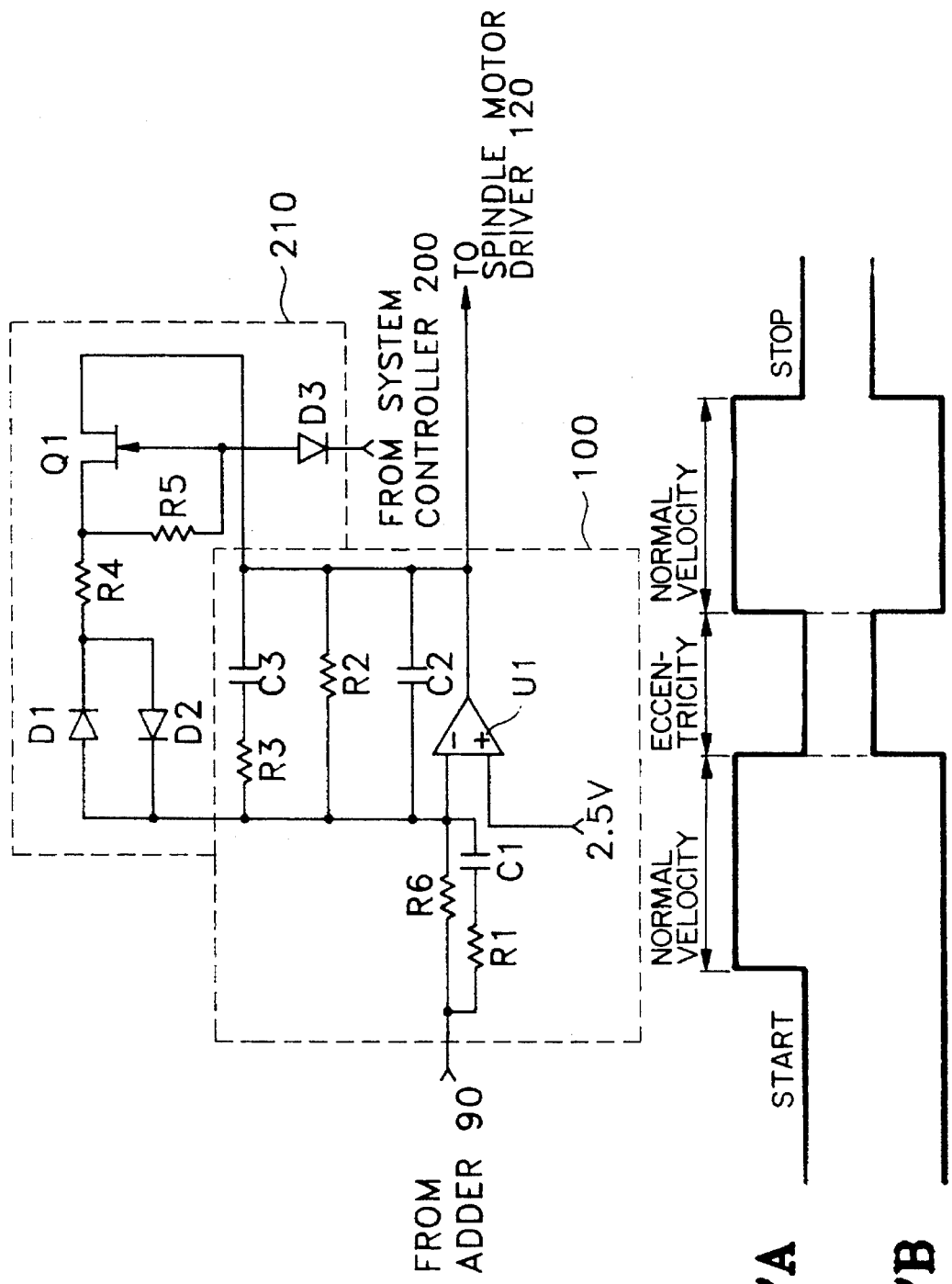

ECCENTRICITY COMPENSATOR FOR OPTICAL DISK PLAYER AND COMPENSATING METHOD THEREFOR

RELATED APPLICATIONS

This is a Continuation-in-Part of application Ser. No. 08/091,134 filed Jul. 14, 1993.

FIELD OF THE INVENTION

The present invention relates to an eccentricity compensator for an optical disk player and compensating method therefor and, more particularly, to an eccentricity compensator for an optical disk player using a double-sided disk and compensating method therefor in which, if the eccentricity amount of the disk is different due to a difference in the center holes of the top and bottom surfaces, gain is controlled to vary the rotating velocity of a spindle motor, thereby compensating for the eccentricity amount of the double-sided disk.

The present disclosure is based on the disclosure of Korean Patent Application No. 92-12527 filed Jul. 14, 1992 which disclosure is incorporated herein by reference for all purposes.

BACKGROUND OF THE INVENTION

Generally, an optical disk player records a signal on a disk in digital form and reproduces the signal according to received light intensity by first projecting a high-intensity light such as a laser beam onto the surface of the disk and then detecting the reflected light.

Conventionally, in a system for single-sided playback only, as shown in FIG. 1, a digital video signal and audio signal are picked up from a disk 5 by a pickup 10 and are demodulated in a demodulator 20. Thereafter, from among the received digital signals (video and audio) from demodulator 20, a charge-coupled device (CCD) 30 outputs only the video signal as an electric signal. Subsequently, a synchronizing signal detector 40 detects the horizontal and vertical synchronizing signals from the video output of CCD 30 and an H sync separator 50 detects only the horizontal sync signal. A first phase comparator 60 then detects the phase difference between the horizontal synchronizing signal (e.g., 15.75 KHz) separated by H sync separator 50 and an input reference horizontal synchronizing signal, so as to output a signal corresponding to the detected phase difference. A color burst signal separator 70 detects the color burst signal (e.g., 3.58 MHz for NTSC) from the video signal output of CCD 30. It will be noted that a second phase comparator 80 detects the phase difference of the color burst signal from color burst signal separator 70 and a reference color burst signal.

An adder 90 adds the phase differences output from the first and second phase comparators 60 and 80, and an amplifier 100 amplifies the summed phase differences to output the result to a spindle motor driver 120. Spindle motor driver 120 converts the phase difference signal output from amplifier 100 into a pulse-width-modulated (PWM) signal so as to drive spindle motor 130.

Meanwhile, a voltage-controlled oscillator (VCO) 110 converts the summed phase difference signal from amplifier 100 into an oscillating frequency which is output to a read clock control port of CCD 30.

However, since an optical disk player for single-sided playback is stabilized by chucking the disk in only one direction (i.e., from the bottom surface) by a clamp installed on a turntable for rotating the optical disk, so as to be raised and lowered and be rotatable as shown in FIG. 2, a double-sided disk cannot be reproduced. Thus, when the disk is reproduced from the top (opposite surface), the spindle control amount increases even though such an optical disk player is mechanically modified so as to be capable of reproducing the double-sided disk.

In the case of a conventional single-sided laser disk, as shown in FIG. 3, since the inner diameter of the hole has an eccentricity of 55 mm+100 μm. However, since chucking stabilization is performed with respect to the single-sided disk in the table structure, the eccentricity amount can be decreased.

For a double-sided disk, since the holes of the top and bottom surfaces of the disk have inner diameters a and b, respectively, as shown in FIG. 4, the inconsistencies with respect to the hole center are produced in manufacturing the disk. In other words, because of the instability induced in the spindle servo due to the difference of the hole centers of the top surface and bottom surface of the disk, when the disk shown in FIG. 4 is reproduced, the pictures become unstable.

To overcome this problem, a structure has been proposed which provides for dual chucking of the disk. The system is first chucked during the bottom-surface playback, and chucked again during the top-surface playback. However, a dual chucking mechanism is complicated and expensive. Such an apparatus for compensating for the eccentricity amount by matching the gains of the tracking servo and tracking position servo in a single-sided disk is disclosed in U.S. Pat. No. 5,121,374.

SUMMARY OF THE INVENTION

The principal object of the present invention is to provide an eccentricity compensator for an optical disk player in which, when a disk in which the eccentricities of the top surface and the bottom surface, i.e., upper and lower surfaces, respectively, are different is reproduced in a double-sided playback optical disk player, the gain is controlled to vary the velocity of a spindle motor and, thus, to compensate for the eccentricity amount.

Another object of the present invention is to provide an eccentricity compensating method for an optical disk player in which, when a disk having differing eccentricities associated with top and bottom surfaces is reproduced in a double-sided playback optical disk player, the gain is controlled to vary the velocity of a spindle motor and, thus, to compensate for the eccentricity amount.

These and other objects, features and advantages according to the present invention are provided by an eccentricity compensator for an optical disk player having a motor driving circuit in which the horizontal synchronizing signal and color burst signal of a signal reproduced from an optical disk are detected and the phases thereof are compared in relation to a reference horizontal synchronizing signal and a reference color burst signal, respectively, so as to control the velocity of a spindle motor according to each compared phase difference. Preferably, the compensator includes:

an amplifier for amplifying the detected phase difference components and outputting the amplified phase difference components to the motor driving circuit;

a controller for recognizing whether a currently played disk surface is the top or bottom thereof and then comparing the error of the velocity controlling amount of the spindle motor with a reference tolerance, so as to output a control signal according to the comparison result; and a gain controller for, in the case of top-surface playback in which the velocity controlling amount is greater than the tolerance, controlling the gain of the amplifier in response to the control signal of the controller, so as to vary the velocity of the spindle motor.

Furthermore, these and other objects, features and advantages according to the present invention are provided by an eccentricity compensating method for an optical disk player for detecting the horizontal synchronizing signal and color burst signal of a signal reproduced from an optical disk and comparing the phases of the detected signals in relation to a reference horizontal synchronizing signal and a reference color burst signal, respectively, so as to control the velocity of a spindle motor according to each compared phase difference. Advantageously, the method includes steps for:

amplifying the detected phase difference signals and outputting a speed control signal of the spindle motor;

recognizing whether a currently played disk surface is the top or bottom thereof and then comparing the error of the velocity controlling amount of the spindle motor with a reference tolerance, so as to output a control signal according to the comparison result; and controlling the gain of the amplifying step in response to the control signal so as to vary the velocity of the spindle motor, in the case of top-surface playback in which the velocity controlling amount is greater than the tolerance.

BRIEF DESCRIPTION OF THE DRAWINGS

The above objects and advantages of the present invention will become more apparent by describing in detail a preferred embodiment thereof with reference to the attached drawings in which like elements are denoted by like or similar numbers and in which:

FIG. 6 is a detailed circuit diagram of the amplifier and gain controller illustrated in FIG. 5; and FIGS. 7A and 7B are illustrative waveform diagrams of a sensor signal input to the system controller and a control signal output therefrom shown in FIG. 5, respectively.

DETAILED DESCRIPTION OF THE PREFERRED EMBODIMENT

Figure 1:
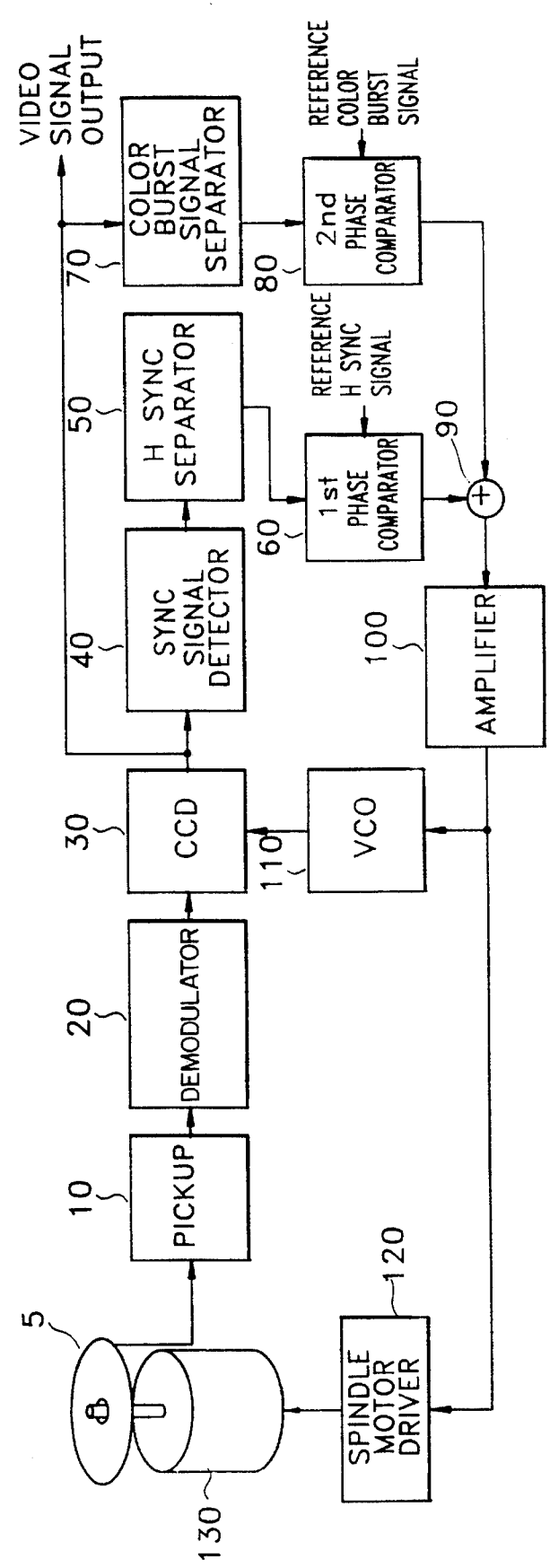
FIG. 1 is a block diagram of a conventional optical disk player.
Figure 2:
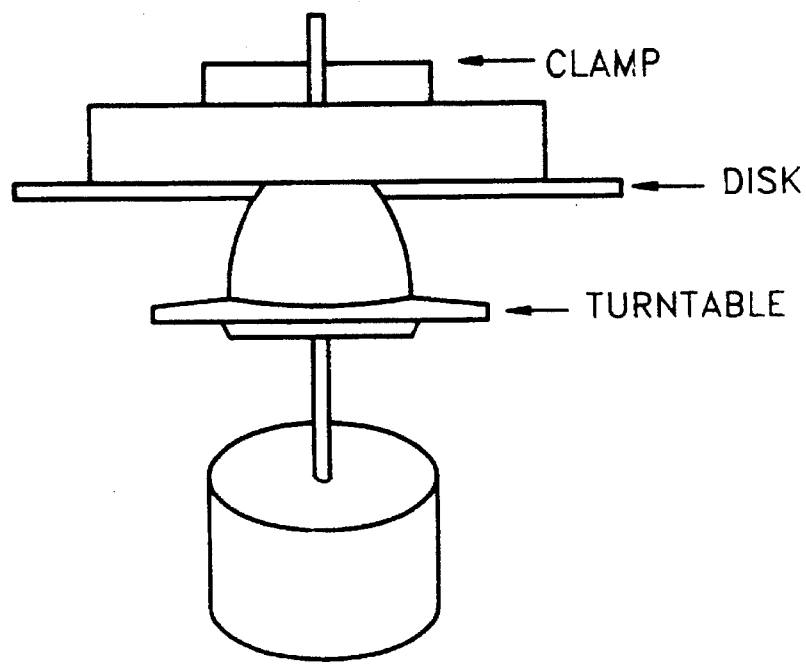
FIG. 2 is a diagram illustrating transportation means of a conventional optical disk player.
Figure 3:
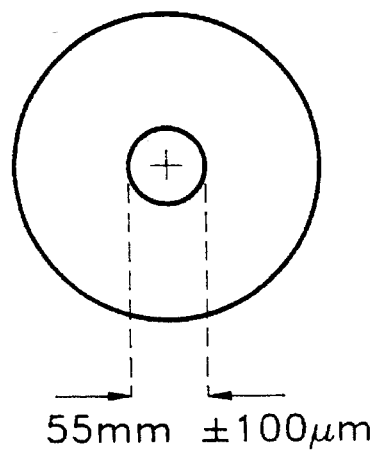
FIG. 3 is a diagram showing the inner hole dimensions of a standard optical disk, e.g., a laser disk.
Figure 5:
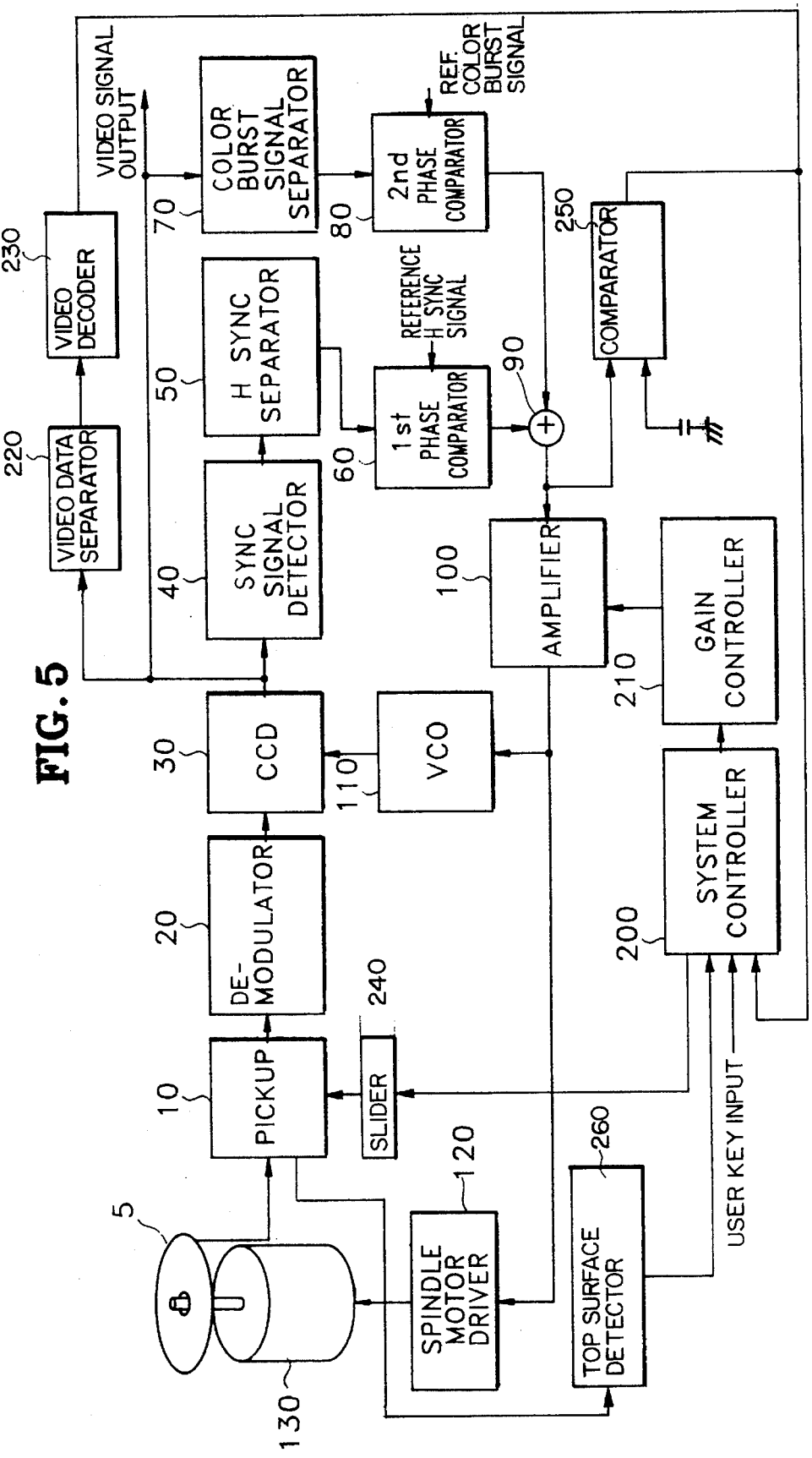
FIG. 5 is a high level block diagram of the eccentricity compensator of an optical disk player according to a preferred embodiment of the present invention.

Referring to FIG. 5, it will first be noted that like elements are numbered with the same reference numerals as in the conventional eccentricity compensator of FIG. 1. The eccentricity compensator of the present invention operates in the same manner as that of the eccentricity compensator shown in FIG. 1 during the playback of the bottom surface of a disk. Thus, in the interest of brevity, the description thereof will not be repeated.

The eccentricity compensator according to the present invention additionally comprises a system controller 200 which, during the playback of the top surface of a disk, receives a signal to which a spindle motor is locked and recognizes a sensor signal generated when the spindle motor veers from the locking range, so as to output a control signal corresponding thereto, and a gain controller 210 for decreasing the gain of amplifier 100' according to a control signal output from system controller 200 and corresponding to a sensor signal indicating that the eccentricity of the top surface playback is greater than the tolerance with respect to the amplified phase difference signal output from adder 90 via amplifier 100'. The eccentricity compensator of the present invention is constructed to be chucked only during bottom-surface playback, as in the apparatus for reproducing a single-sided disk.

The top surface playback operation of the eccentricity compensator of the present invention shown in FIG. 5 will now be described below.

Pickup 10 picks up the digital video signal and audio signal recorded on a disk 5, and demodulator 20 demodulates the picked-up signals. Thereafter, CCD 30 outputs only the video signal from among the digital signals (audio and video) from demodulator 20. Subsequently, synchronizing signal detector 40 detects the vertical and horizontal synchronizing signals from the video signal output from CCD 30, and H sync separator 50 detects only the horizontal synchronizing signal. The first phase comparator 60 then detects the phase difference between the horizontal synchronizing signal (15.75 KHz for NTSC) from H sync separator 50 and a reference horizontal sync signal, so as to output a signal corresponding to the detected phase difference. Color burst signal separator 70 detects a color burst signal from the video signal output from CCD 30. Preferably, the second phase comparator 80 compares the phases of the color burst signal output from color burst signal separator 70 and a reference color burst signal, so as to detect the phase difference.

Adder 90 adds the phase differences output from first and second phase comparators 60 and 80, and amplifies the added phase differences through amplifier 100' to output them to spindle motor driver 120.

Figure 4:
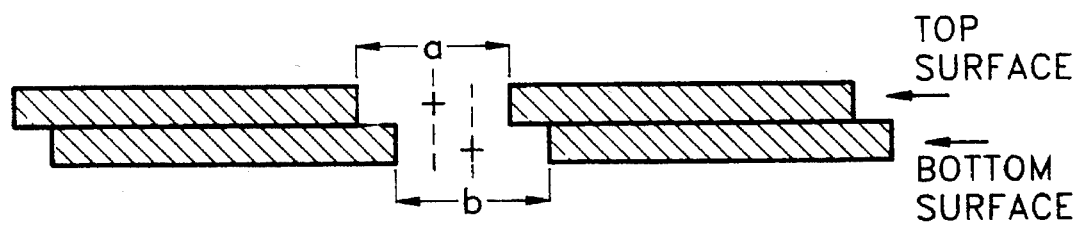
FIG. 4 is a cross-sectional view of a double-sided disk.

As shown in FIG. 4, if the eccentricity amounts of the top surface and bottom surface are different, system controller 200 recognizes a "high" level signal corresponds to the top surface playback mode (to be described later) and which is generated when the error with respect to the velocity control amount is greater than tolerance, to thereby output a "low" level control signal as shown in FIGS. 7A and 7B.

Gain controller 210 operates to decrease the gain of amplifier 100' according to the control signal output from system controller 200.

Spindle motor driver 120 converts the gain-controlled and amplified phase difference signal from amplifier 100' into a PWM signal, to drive spindle motor 130. It should be noted that an increased pulse width of the PWM signal indicates a greater error. The PWM signal controls the spindle motor 130, which is driven at high speed.

On the other hand, system controller recognizes whether the current mode is a top surface playback mode or a bottom surface playback mode, and controls gain controller 210 to operate only when the current mode is the top surface playback mode, because the eccentricity amount can be compensated by the chucking stabilization during bottom-surface playback. However, for top-surface playback, since the top surface is not chucked, the eccentricity amount is compensated through a gain control procedure.

In FIG. 5, when the user loads a double-sided disk in the player, and then presses a function key or a side key designating top-surface playback, or when the current mode is automatically or manually converted into a top surface playback mode after the currently reproduced bottom surface has been completely reproduced, system controller 200 recognizes the top surface playback mode.

Thus, as shown in FIG. 5, if the user presses the side key, a signal is input to system controller 200 to make the system controller control a slider 240 to move pickup 10 to the top surface of the disk. Preferably, a top surface detector 260 is advantageously provided on or near the disk for supplying a "high" signal to system controller 200. In an exemplary case, top surface detector 260 is connected between pickup 10 and system controller 200 so as to permit, e.g., extraction of an index signal or other control signal to thereby detect the currently played disk surface and generate a detection signal corresponding to one of a top surface and a bottom surface. Alternatively, a top surface detector (not shown) can be advantageously provided on or near the disk and connected to system controller 200 to thereby produce a top surface detection signal by detecting a mark or some other physical indication, e.g., a groove, formed on the disk. Accordingly, system controller 200 recognizes the top surface playback mode of operation.

Thus, as shown in FIG. 5, if the user presses the side key, a signal is input to system controller 200 to make the system controller control a slider 240 to move pickup 10 to the top surface of the disk. Preferably, a top surface detector (not shown) is advantageously provided on or near the disk for supplying a "high" signal to system controller 200. Accordingly, system controller 200 recognizes the top surface playback mode.

On the other hand, to move pickup 10 to the top surface of the disk after the bottom surface playback has been completed, there are provided a video data separator 220 which receives the output of CCD 30 and separates the video data from the received signal, and video decoder 230 for decoding the separated video data. Video decoder 230 decodes a value of a lead-out code among a bypass digital code signal on the 16th–18th or 279th–281st horizontal scanning lines in the vertical blanking signal period to detect a lead-out area. The detected signal is supplied to system controller 200. Accordingly, system controller 200 drives slider 240 to move pickup 10 to the top surface of the disk. Then, system controller 200 recognizes the top surface playback mode using a signal supplied from the top surface detector (not shown).

Advantageously, system controller 200, which recognizes the top surface playback mode, receives a logic "low" sensing signal generated whenever an error with respect to a velocity control amount is greater than a predetermined tolerance and disk eccentricity occurs during a top surface playback mode. Then, system controller 200 supplies a "high" signal with respect to the eccentricity amount to compensate the error value to gain controller 21 0, which performs a gain control operation. The comparator 250 compares a level obtained through adder 90 with a reference level, to thereby generate a "low" signal as a sensing signal when the adder output level does not equal a nominal velocity, e.g., when an error is generated due to the eccentricity of the disk. Accordingly, system controller 200 controls gain controller 210 to perform gain control.

Referring to FIG. 6, amplifier 100' of FIG. 5 comprises an operational amplifier U1, resistors R1, R2, R3 and R6 and capacitors C1, C2 and C3. The resistor R6, and the serially connected resistor R1 and capacitor C1 are connected in parallel between the output of adder 90 and the inverting port (−) of operational amplifier U1. Meanwhile, a 2.5 Volt reference voltage is connected to the non-inverting port (+) of operational amplifier U1. Capacitor C2, resistor R2 and the serially connected resistor R3 and capacitor C3 are connected in parallel between the inverting port and the output port of operational amplifier U1.

Gain controller 210 of FIG. 5 advantageously includes diodes D1, D2, and D3, a field-effect transistor (FET) Q1, and resistors R4 and R5, connected as shown in FIG. 6.

The anode of diode D1 and cathode of diode D2, which operate as a limiter, are connected to the inverting port of operational amplifier U1. The cathode of diode D3 is connected to the control signal (CON) output port of system controller 200. The gate of FET Q1 is connected to the anode of diode D3, and resistor R5 is connected to between the gate and the source of FET Q1. One terminal of resistor R4 is commonly connected to the cathode of diode D1 and the anode of diode D2, while the other terminal of thereof is connected to the source of FET Q1 whose drain is connected to the output of operational amplifier U1.

The operation of FIG. 6 will be described below.

The resistor R1 and capacitor C1, which are connected to the inverting port of operational amplifier U1 of amplifier 100' form a high-pass filter. Resistor R3 and capacitor C3 form a low-pass filter while capacitor C2 forms a mid-band filter.

During normal bottom-surface playback, the gain of amplifier 100' is determined by the ratio established by resistor R6 connected to the inverting port of operational amplifier U1 and resistor R2 connected between the inverting port and output port of operational amplifier U1.

As shown in FIG. 7A, when an error with respect to the velocity control signal is greater than the tolerance, that is, when the playback speed of the disk is abnormal, a logic "low" sensing signal is generated, and when it is normal, a logic "high" sensing signal is generated. A control signal CON output from system controller 200 to gain controller 210 during top-surface playback is output as a "high" signal, as shown in FIG. 7B, only when the sensing signal of FIG. 7A is "low". Preferably, diode D3 and resistor R5 stabilize the control signal input to the gate of FET Q1. When FET Q1 becomes conductive in response to the logic "high" from system controller 200, diodes D1 and D2 output only a component above or below a predetermined level from the phase difference signals generated by adder 90.

The gain of the signal limited by diodes D1 and D2 is reduced by resistors R4 and R5. Specifically, if the value of resistor R4 is set to be considerably smaller than that of resistor R2, then the parallel resistance value of resistors R4 and R2 is roughly the same as the value of resistor R4 because, during the top-surface playback (i.e., the velocity controlling amount is greater than the tolerance), resistors R4 and R2 are connected in parallel via FET Q1, the gain is thus reduced by the new ratio value determined by the parallel resistance of resistor R6 and resistor R4. During bottom-surface playback, the gain is determined by the ratio of resistor R6 and resistor R2. The values of resistor R4 and resistor R2 are appropriately selected so as to reduce the top-surface playback gain to two thirds that during bottom-surface playback.

As described above, in order to compensate for the eccentricity difference between the top surface and bottom surface due to the difference of the center holes during doubled-sided playback, the eccentricity compensator of an optical disk player of the present invention reduces the gain during the top-surface playback, thereby simplifying the circuit and reducing production costs.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An eccentricity compensator for an optical disk player having motor driving means in which a horizontal synchronizing signal and a color burst signal of a signal reproduced from an optical disk are detected and associated phases thereof are compared with a reference horizontal synchronizing signal and a reference color burst signal, respectively, so as to control velocity of a spindle motor according to each compared phase difference, said compensator comprising:

amplifying means for amplifying respective detected phase difference signals to thereby generate amplified phase difference signals applied to said motor driving means;

controlling means for recognizing whether a currently played disk surface is a top surface or a bottom surface thereof and then comparing an error representing a velocity controlling amount of said spindle motor with a reference tolerance, so as to output a control signal according to the comparison result; and gain control means for, in the case of top-surface playback in which said velocity controlling amount is greater than the reference tolerance, controlling the gain of said amplifying means in response to said control signal of said controlling means, so as to vary said velocity of said spindle motor.

2. The eccentricity compensator for an optical disk player as claimed in claim 1, wherein said gain control means comprises:

switching means which turns on in response to said control signal output from said controlling means when said velocity controlling amount is greater than said reference tolerance;

limiting means for detecting only a signal above or below a predetermined level from respective detected phase difference signals; and a gain-control resistor connected between said switching means and said limiting means for controlling an output amplitude of said limiting means.

3. The eccentricity compensator for an optical disk player as claimed in claim 2, wherein, during top-surface playback, said controlling means controls said switching means according to said control signal responsive to a sensor signal output when said error of said velocity controlling amount of said spindle motor is greater than said reference tolerance.

4. An eccentricity compensating method for an optical disk player for detecting a horizontal synchronizing signal and a color burst signal of a signal reproduced from an optical disk and comparing the phases of respective detected signals in relation to a reference horizontal synchronizing signal and a reference color burst signal, respectively, to thereby generate detected phase difference signals so as to control velocity of a spindle motor according to each said compared phase difference, said method comprising the steps of:

amplifying said detected phase difference signals to thereby generate a speed control signal for the spindle motor;

recognizing whether a currently played disk surface is a top surface or a bottom surface thereof and then comparing an error of a velocity controlling amount of the spindle motor with a reference tolerance, so as to output a control signal according to a comparison result; and controlling a gain produced by said amplifying step in response to said control signal so as to vary said velocity of said spindle motor during top-surface playback in which said velocity controlling amount is greater than said reference tolerance.

5. An eccentricity compensating method for an optical disk player for detecting a horizontal synchronizing signal and a color burst signal of a signal reproduced from an optical disk and comparing the phases of respective detected signals in relation to a reference horizontal synchronizing signal and a reference color burst signal, respectively, to thereby generate detected phase difference signals so as to control velocity of a spindle motor according to each said compared phase difference, said method comprising the steps of:

(a) recognizing whether a currently played disk surface is a top surface or a bottom surface thereof;

(b) amplifying said detected phase difference signals using a first predetermined gain to thereby generate a first speed control signal for the spindle motor during playback of said bottom disk surface; and (c) amplifying said detected phase difference signals using a second predetermined gain to thereby generate a second speed control signal for the spindle motor during playback of said top disk surface.

6. An eccentricity compensating method for an optical disk player as recited in claim 5, further comprising the step of:

(d) selecting one of said first gain and said second gain in response to a comparison between a summation of said detected phase difference signals and a reference tolerance to thereby output a control signal according to a comparison result.

* * * * *